United States Patent [19]

Baltz et al.

[11] 4,107,261

[45] * Aug. 15, 1978

[54] PROCESS FOR THE SEPARATION OF PLATINUM GROUP METALS

[75] Inventors: John Baltz, Lakewood; Enzo Coltrinari, Arvada, both of Colo.

[73] Assignee: PGP Industries Inc., Santa Fe Springs, Calif.

[ * ] Notice: The portion of the term of this patent subsequent to Mar. 15, 1994, has been disclaimed.

[21] Appl. No.: 750,738

[22] Filed: Dec. 15, 1976

Related U.S. Application Data

[63] Continuation of Ser. No. 629,879, Nov. 7, 1975, Pat. No. 4,012,481.

[51] Int. Cl.$^2$ ............................................ C01G 55/00
[52] U.S. Cl. ................................ 423/22; 75/101 BE; 423/658.5
[58] Field of Search ............................. 423/22, 658.5; 75/101 BE

[56] References Cited

U.S. PATENT DOCUMENTS

| 3,787,554 | 1/1974 | Ziegler | 423/22 |
| 3,823,220 | 7/1974 | Donauna | 423/22 |
| 3,960,549 | 6/1976 | MacGregor | 75/101 BE |
| 3,979,207 | 9/1976 | MacGregor | 75/101 BE |

FOREIGN PATENT DOCUMENTS 2,457,622  6/1975  Fed. Rep. of Germany ............. 423/22

OTHER PUBLICATIONS

Beamish, "Tantala", vol. 14, 1967.
Faye et al., "Anal. Chem.", vol. 35, 1963, pp. 985–988.

Primary Examiner—Herbert T. Carter
Attorney, Agent, or Firm—Darby & Darby

[57] ABSTRACT

Disclosed herein is a process for the separation and recovery of Rhodium values from aqueous mineral acid solutions also containing Iridium and/or Ruthenium which comprises contacting the metal bearing aqueous solution with a water immiscible organic solvent containing an organically substituted quaternary amine salt to extract Iridium and Ruthenium into the solvent phase leaving Rhodium in the aqueous raffinate. The loaded organic phase is stripped of Iridium and Ruthenium in two sequential steps by contacting it first with an alkaline solution then redissolving the resulting precipitate in an acidified reducing solution.

6 Claims, No Drawings

PROCESS FOR THE SEPARATION OF PLATINUM GROUP METALS

This is a continuation of application Ser. No. 629,879, filed Nov. 7, 1975, now U.S. Pat. No. 4,012,481.

This invention relates to a method for separating dissolved metal salts from aqueous mineral acid solutions and more specifically to a scheme for separating Rhodium from Iridium and/or Ruthenium by solvent extraction with an organically substituted quaternary ammonium salt and recovering the Iridium and Ruthenium values from the loaded organic. Still more specifically, the invention relates to a method for the organic solvent extraction of Iridium and/or Ruthenium from aqueous chloride solutions containing Rhodium, Iridium and Ruthenium and recovery of the isolated Iridium and Ruthenium values from the loaded organic phase.

The separation of Rhodium from Iridium has long been considered a difficult aspect of Platinum group metal separation. The traditional methods for separating Rhodium-Iridium-Ruthenium from one another are well known in the art, but involve long and tedious processing operations.

More recently, somewhat faster methods have been evolved for separating Iridium-Rhodium-Ruthenium from aqueous solution by ion exchange. There are, however, several drawbacks and disadvantages involved in such processes. Ruthenium may be reduced on ion exchange resins and the $IrCl_6{-}2$ ion is difficult to elute. Also, the nature of the Rhodium-containing species is very sensitive to solution conditions on the resin column and may change when the metal bearing solution is on the column to prevent the separation.

Tertipis et al describe the solvent extraction of Iridium from hydrochloric acid solutions containing Rhodium through the use of tributyl phosphate in Analytical Chemistry 33 (1961), No. 12, pages 1650 through 1652. However, this technique is undesirable since it involves reaction conditions which significantly restrict its general usefulness.

The problem of successfully separating Rhodium from Iridium by solvent extraction with tributyl phosphate is further complicated when the pregnant aqueous solution in which the metals are dissolved also contains Ruthenium. In such instances substantial difficulty is encountered in obtaining a pure Rhodium product as the Ruthenium contaminates both the Iridium and Rhodium thereby frustrating the isolation of a pure form of either metal.

It has now been unexpectedly discovered that Rhodium values can be quickly and easily separated from aqueous mineral acid solutions containing Rhodium, Iridium and Ruthenium by solvent extraction with an organic solvent containing an organically substituted quaternary ammonium compound. It has also been found that the Iridium-Ruthenium values extracted into the amine solvent can be stripped and recovered as a mixture of Iridium and Ruthenium salts by sequentially contacting the loaded organic with an aqueous alkaline solution and an acidified reducing agent. In operation, a water immiscible organic solvent containing an organically substituted quaternary ammonium salt is brought into contact with the aqueous mineral acid solution and forms a complex with Iridium and Ruthenium which are present in the solution in their anionic states. The complex is extracted into the solvent phase leaving Rhodium (present in the acid solution as a cation) in the aqueous raffinate phase. After phase separation, Iridium and Ruthenium are simultaneously stripped and recovered from the loaded organic by sequential contact with predetermined stoichiometric quantities of an alkaline solution and an acidified reducing solution.

It is accordingly an object of the present invention to provide a highly selective process for separating Rhodium from aqueous solutions containing Iridium, Rhodium and Ruthenium.

Another aspect of the invention is a method for separating Rhodium from an aqueous solution also containing Ruthenium and Iridium by extracting the Iridium and Ruthenium into an organic phase containing a substituted quaternary ammonium compound.

A further aspect of the present invention involves the method of stripping and recovering the Iridium and Ruthenium complex from the loaded amine organic phase by sequential treatment with predetermined stoichiometric quantities of an alkaline solution and an acidified reductant stripping solution.

These and other aspects of the present invention are more completely explained in the following specification and examples.

According to the present invention, cationic Rhodium is separated from an aqueous mineral acid solution containing cationic salts of Rhodium as well as Iridium and Ruthenium in their anionic oxidized state by solvent extraction with an organically substituted quaternary ammonium salt. Contacting the aqueous solution with a solvent containing the quaternary amine leads the Iridium and Ruthenium values to form a complex with the amine that is preferentially soluble in the solvent phase, leaving Rhodium in the aqueous raffinate. As used in the present invention, the term "raffinate" refers to an aqueous solution (or phase) after solvent extraction, i.e., a solution that has been depleted of all or part of its valuable metal content by transfer to an organic phase.

The Rhodium, which must be present in the mineral acid solution in its cationic state, is not extracted into the amine solvent, and is won from the aqueous raffinate by conventional processes such as copper cementation. The Iridium-Ruthenium loaded organic amine phase is treated with at least the stoichiometric quantity of an aqueous solution of an alkaline reagent required to breakup the amine complex formed between Iridium and Ruthenium and produce a precipitate which is the alkaline salt form of the extracted metal values. The resulting alkaline/solvent mixture is then contacted with an acidified reducing agent to solubilize the Iridium and Ruthenium precipitates into an aqueous acidic solution from which they may readily be isolated by known methods.

The aqueous phase from which Iridium and Ruthenium are extracted in the present invention is ordinarily a mineral acid leach solution of the type normally resulting from the fusion and leaching of Platinum metal ore concentrates. The invention will be further described by reference to separation and recovery of Rhodium, Iridium and Ruthenium from hydrochloric acid solutions such as generally occur in Platinum group metal recovery. However, the invention is not limited as such and may be operated to separate metals from solutions of other mineral acids which are used in the recovery or assay of Platinum group metal values, provided the acid does not attack or degrade the organic extractant and will afford the formation of organic soluble complexes of the desired metals with the quaternary amine extractant. In aqueous chloride solutions, the soluble Rhodium-Iridium-Ruthenium compounds are generally present as complex chloro salts or in a form of their corresponding hydrochloric acid complexes. Typically, such leach solutions result from crude ore processing operations and range between 0.1 to about 5 normal HCl and up to about 250 grams per liter $Cl^-$ and in some instances higher. In addition to the Platinum group metals, the solutions may contain other base metal impurities such as lead, copper, bismuth, nickel, aluminum, silica, silver, and barium.

It has been discovered that in order to achieve an effective separation of Iridium and Ruthenium from Rhodium in the preferred hydrochloric acid solutions, it is necessary to have Rhodium present in the form of a cationic chloro complex of Rhodium and for the Iridium and Ruthenium to exist as oxidized Iridium and Ruthenium chloro complexes respectively. This is important as the oxidized Iridium and Ruthenium chloro complexes behave as an anion toward the organic extraction mixture and are extracted, whereas the Rhodium chloro complex behaves as a cation and is not extractable with the organically substituted quaternary amine extraction agent. The foregoing differences in ionic condition are maintained throughout the extraction so that the organic phase containing the amine complexing agent does not become fouled with Rhodium chloro complexes which would behave as anionic species and be extracted. The aqueous acid solutions from which the aforementioned metals are extracted are preferably substantially free of gold, iron, Platinum, and Palladium which are removed beforehand by conventional techniques well known in the art.

The extraction liquid used to separate Iridium and/or Ruthenium from Rhodium consists of three constituents: an organic extractant, a water immiscible carrier solvent and a phase modifier.

In the present invention an aqueous mineral acid solution containing, for example, Iridium, Rhodium and Ruthenium dissolved in a hydrochloric acid solution is contacted with a water immiscible organic solvent containing a quaternary ammonium compound capable of forming complexes with Iridium and Ruthenium that are preferentially soluble in the resultant organic phase. The quaternary ammonium compounds capable of performing these functions have the following basic structure:

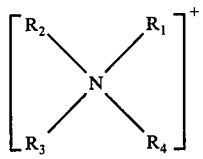

wherein $R_1$, $R_2$, $R_3$ and $R_4$ are straight or branched aliphatic alkyl or aromatic hydrocarbon groups. Generally at least one of $R_1$, $R_2$, $R_3$ and $R_4$ are fatty alkyl groups. Aliquat 336, methyl tricaprylyl ammonium chloride, manufactured by General Mills, is an effective extractant and has the following cation:

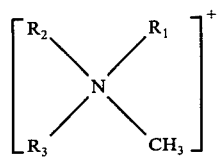

wherein $R_1$, $R_2$, and $R_3$ are hydrocarbon chains having eight to ten carbon atoms, with eight carbon atoms prevailing. Also useful as the amine solvent extractant are Adogen 468 methyltri-n-alkylammonium chloride (average $C_{10}$), and Adogen 464 methyltri-n-alkylammonium chloride ($C_8 - C_{10}$) (both made by Ashland Chemical Co.). The organically substituted quaternary amines which may be used in the present invention must be sufficiently soluble in at least one of the solvents referred to below, or mixtures of them to make at least a 1% solution. Finally, the ammonium compound should provide for ready phase disengagement following extraction. The preferred organic extractant in the present invention is Aliquat-336. Prior to use in the extraction the amine extractant is usually conditioned to the form of the acid solution to be contacted. Thus in the preferred embodiment in which Iridium and Ruthenium are extracted from hydrochloric acid solution, the extractant is conditioned to chloride form by treatment with NaCl in 1N HCl.

The major constituent of the extraction liquid is a water immiscible carrier solvent in which the organic amine extractant is dissolved to form the organic phase.

Conventional organic solvents including, for example, aliphatic hydrocarbons such as petroleum derived liquid hydrocarbons, either straight chain or branched, kerosene, fuel oil, etc., are useful in the invention. Various aromatic solvents or chlorinated aliphatic solvents may also be employed such as benzene, toluene, xylene, carbon tetrachloride and perchloroethylene. The organic solvents must be substantially water immiscible and capable of dissolving the organically substituted amine extractant. In addition, the solvent should be inert and not interfere with the extraction of Iridium and Ruthenium metal values from acid solution by the organically substituted amine. Kerosene available as AMSCO 175 is preferably employed because of its ready availability and as a matter of economy.

The organically substituted quaternary amine component of the organic extractant mixture must have a solubility of at least about 1% by weight in the hydrocarbon solvent of the organic phase which must be insoluble in water.

A phase modifier is also admixed with the carrier solvent and extractant to prevent the formation of a third phase in stripping the pregnant organic. Water insoluble straight or branched chain aliphatic alcohols containing at least 6 carbon atoms are generally used as phase modifiers. Examples of suitable phase modifiers include isodecanol, 2-ethyl hexanol and tridecanol. Isodecanol is preferred for use in the present invention.

The organic mixtures of the present invention will usually contain from about 5 to 15 volume percent of the organic amine extractant, between about 85 and 95 volume percent of the carrier solvent, and from about 1 to about 5 volume percent of the phase modifier. Although the preceding criteria are generally applicable, the invention is not limited to operation within these boundaries. Since only a limited amount of the active extracting ingredient is present in the solvent phase, it can only hold a limited amount of any given metallic element at saturation. Once the concentration of metal in the solvent has reached the saturation level, no additional metal will go into the solvent regardless of its concentration in the aqueous phase. The quantity of metal which a given solvent extractant will hold is termed "the maximum loading" and governs the total quantity of solvent required to do a given amount of extraction. Based upon the maximum loading characteristics of the particular extractant, the metal-bearing characteristics of the leach liquor that is to be extracted and the number of extraction stages to be employed, the concentration of extractant and phase modifier in the solvent may be adjusted, or the Organic/Aqueous (O/A) ratio for any particular extractant concentration may be varied to achieve a desired loading. In one effective version of the extraction process the organic liquid mixture used to extract Iridium and Ruthenium from an aqueous hydrochloric acid solution comprises 10 volume percent Aliquat-336, 87 volume percent kerosene and 3 volume percent isodecanol. As a measure of economy, it is preferred to employ the lowest organic/aqueous ratio that will provide efficient separation of the desired metal values from a given aqueous mineral acid solution.

The liquid-liquid extraction may be carried out by continuous countercurrent or batch processing procedures.

Typical apparatus for use in the present invention could include (without limitation thereto) a multiple stage countercurrent mixer-settler system in which the barren organic solvent and a pregnant aqueous stream are mixed together for a predetermined time period following which they are permitted to separate in a settling reservoir. The solvent and aqueous then flow in opposite directions to the next stage of contact.

Briefly summarizing the separation and recovery process operation, fresh metal bearing aqueous mineral acid solution is contacted and admixed with the organically substituted quaternary amine solvent for a predetermined time period under oxidizing conditions. The iridium and ruthenium anions in the aqueous solution form a complex with the amine and are extracted into the solvent phase. The admixture is permitted to settle into distinct organic and aqueous phases which are isolated from one another. Iridium and ruthenium are simultaneously stripped from the metal loaded organic phase by sequential treatment with at least the stoichiometric quantity of alkaline solution which will neutralize the acid salt of the amine followed by treatment with an acidic reducing solution. Rhodium is won from the aqueous raffinate by known methods (e.g., cementation with copper powder). Iridium and ruthenium may also be isolated from the stripping solution using conventional techniques known to the art.

An important aspect of the present invention involves conditioning (oxidizing) the metal bearing acid solution to an emf or redox potential as measured by means of a platinum-calomel electrode of between about $-500$ and $-1000$ millivolts (otimally about $-900$ mv) prior to the organic extracting operation in order to maintain high extraction efficiencies and promote the production of rhodium solutions essentially barren of iridium and ruthenium. It should be noted that while the extraction process will operate at emf values less than $-500$ mv, extraction efficiencies become correspondingly lower. The conditioning treatment is continued through the extraction to insure that the aqueous phase is maintained in the oxidized state. The conditioning operation can be accomplished by the addition of sodium hypochlorite (NaOCl) solution at a controlled rate to the aqueous acid solution to be extracted to maintain the solution in an oxidized condition (indicated by obtaining an emf reading between $-500$ and $-1000$ millivolts, and preferably about $-900$ mv). Alternatively, chlorine gas ($Cl_2$) or other oxidants (e.g., peroxide) can be employed to accomplish the same results as sodium hypochlorite.

The iridium-ruthenium extraction and stripping operations are preferably carried out at about 25° C although satisfactory performance has been achieved at temperatures in the range 20° C – 40° C and up to 50° C and higher. At temperatures below about 20° C the phase disengagement is slow, while operation above 40° C is hazardous due to the danger of fire.

Alkaline stripping reagents for use in the present invention must be water soluble compounds which will convert the extracted metal values contained in the organic solvent into reaction products that are readily soluble when contacted with the acidic reduction solution. Stripping efficiency (i.e., the ability to remove a large quantity of metal salt per unit volume of strippant) is also an important criteria for selection of an alkaline stripping agent. Suitable alkaline agents include water soluble alkali and alkaline earth carbonates, bicarbonates and hydroxides, e.g., sodium and potassium hydroxide, carbonate or bicarbonate, although sodium hydroxide is preferably employed. The amount of alkaline strippant required is at least the quantity which will neutralize the acid salt (usually the chloride) form of the quaternary amine organic and desirably includes in excess of the stoichiometric amount (preferably about 50-100%) of the alkaline agent to insure efficient stripping within the shortest possible contact times. By contacting the loaded organic solvent with the alkaline stripping solution, the organic soluble Iridium and Ruthenium organic amine complexes are converted to metal salts and chloride form of the amine.

Although metallic values can be recovered from the loaded organic using only the acidified reducing strip solution and without a prior contact with an alkaline reagent, it has been unexpectedly discovered that a consistently higher percentage of the Iridium and Ruthenium metals present in the organic solvent were stripped using sequential treatment with alkaline solution and an acidic reducing agent.

The acidified reductant stripping agents are selected based upon their capacity to contribute additional stripping action to the alkaline treated loaded amine organic as well as for their ability to maintain a reducing environment in the strip solution. The latter criteria is most important to prevent inadvertent reextraction of the Platinum group metal values from the strip solution. Also, the strippant should not contribute any foreign metals to the organic which might cause eventual fouling or a reduction in loading capacity. Satisfactory reductant stripping agents include acidic solutions of hydrazine salts, hydroxylamine salts, $SO_2$, and conventional organic reducing agents (i.e., organic acids such as oxalic). The reductant stripping solutions are acidified to between about 0.5-2.5 N (preferably 2.0 N) to solubilize the Iridium and Ruthenium alkaline salts. One suitable reducing solution is hydrazine dihydrochloride ($N_2H_4.2HCl$) acidified to 2.0 N HCl.

The quantity of acidified reducing agent utilized is at least the stoichiometric amount based upon the alkaline strippant previously added, and desirably includes in excess of the stoichiometric amount (preferably about 100–150% to insure complete dissolution of the precipitated Iridium and Ruthenium values in the aqueous phase. Additionally, some further stripping action is realized during the contact period with the acidified reducing strip solution. Although suggested concentrations of strippant solutions have been described herein, those skilled in the art will recognize that these may be varied depending upon the organic volumes to be treated, stripping efficiency of a particular strippant, to adjust the quantity and concentration of strip to yield strip solutions containing significant quantities of dissolved Iridium and Ruthenium values and to avoid dilution and handling of weak and/or large volumes of solution.

The time required for stripping contact will vary from one loaded organic to another depending upon the particular solvent system, the quantity of Iridium and Ruthenium sought to be stripped and the temperature at which the stripping operation is conducted. In most instances strip contact times of between 1 and 10 minutes can be utilized to provide satisfactory results.

The invention is further illustrated by the following examples.

The examples present in Table 1 were performed to illustrate the method of effecting a more complete separation of Rhodium from Iridium and Ruthenium by maintaining a high oxidation state of the aqueous feed liquor. It should be noted, however, that the present invention is not limited to operation strictly according to the instant example.

In Test No. 1 a predetermined amount of Iridium-Rhodium-Ruthenium aqueous acid solution analyzing 4.6 g/l Rhodium, 1.25 g/l Iridium and 4.5 g/l Ruthenium, 265 g/l Cl⁻ at 1 normal HCl and having a measured emf of −520 millivolts was contacted 4 times in succession with fresh organic extractant at an organic to aqueous ratio of 2 to 1. Each contact was for a period of 2 minutes. Following each contact the phases were separated and the amount of Iridium and Ruthenium extracted determined by analysis. In Test No. 2 the identical Rhodium-Iridium-Ruthenium solution was adjusted to emf −900 millivolts by gaseous $Cl_2$ oxidation and then extracted 4 times in succession with fresh solvent in a like manner described above. The extraction organic in both of the above examples contained 10 volume % Aliquat-336, 3 volume % isodecanol, and 87 volume % kerosene (AMSCO 175) and was conditioned to the chloride form of the organic by contacting with a solution of 100 g/l NaCl in 1 normal HCl followed by washing using a solution 20 g/l NaCl adjusted to pH 1.5 with HCl.

Table 1

Rh-Ir-Ru Extraction by Aliquat-336 at Various Solution EMF's
—Assay g/l—

| Test No. | Contact No. | Aqueous EMF, mv | Feed Aqueous | | | Raffinate | | | Loaded Organic | | | % Extracted | | |
|---|---|---|---|---|---|---|---|---|---|---|---|---|---|---|
| | | | Rh | Ir | Ru | Rh | Ir | Ru | Rh | Ir | Ru | Rh | Ir | Ru |
| 1 | | −520 | 4.6 | 1.25 | 4.5 | | | | | | | | | |
| | 1 | | | | | 4.3 | 0.43 | 1.8 | 0.06 | 0.30 | 1.4 | | | |
| | 2 | | | | | 4.1 | 0.34 | 1.3 | 0.08 | 0.05 | 0.23 | | | |
| | 3 | | | | | 3.9 | 0.31 | 1.1 | 0.09 | 0.03 | 0.09 | | | |
| | 4 | | | | | 3.7 | 0.27 | 0.8 | 0.09 | 0.03 | 0.08 | 20 | 78 | 82 |
| 2 | | −900 | 4.6 | 1.25 | 4.5 | | | | | | | | | |
| | 1 | | | | | 4.4 | 0.02 | 0.7 | 0.04 | 0.54 | 2.0 | | | |
| | 2 | | | | | 4.1 | 0.03 | 0.1 | 0.07 | 0.02 | 0.27 | | | |
| | 3 | | | | | 3.9 | 0.03 | 0.02 | 0.08 | 0.01 | 0.04 | | | |
| | 4 | | | | | 3.8 | 0.03 | 0.008 | 0.06 | <0.01 | 0.009 | 17 | 97 | 99 |

It will be seen from the above results that maintenance of a high oxidation state during extraction results in a more complete separation of Iridium-Ruthenium from Rhodium and produces a lower Iridium/Ruthenium raffinate for recovery of Rhodium by cementation.

The examples presented in Table 2 were performed to show the increase in stripping efficiency when using the combination alkaline plus acidified reducing solution strip treatment. For both examples in Table 2 a 10% by volume Aliquat-336 solution in kerosene containing 3% by volume isodecanol was loaded with Iridium and Ruthenium by contacting with an acidic Rhodium-Iridium-Ruthenium chloride solution oxidized to emf −900 mv by addition of 50 g/l NaOCl solution. A 100 ml portion of the loaded organic was agitated for 10 minutes with 50 g/l $N_2H_4.2HCl$ in 2 N HCl at an organic to aqueous ratio of 2 to 1 at room temperature. The percentage of Iridium and Ruthenium stripped was determined by analysis of the separated phases. A second 100 ml portion of the same loaded solvent was agitated with 8 ml of 200 g/l NaOH (2X stoichiometric based on the normality of the prepared amine organic) for 5 minutes at room temperature. Following the caustic reaction period, 42 ml of 50 g/l $N_2H_4.2HCl$ in 2 N HCl was added (2.1 X stoichiometric based on the amount of caustic solution added) and the mixture stirred for an additional 10 minutes at room temperature. The final stripped volumes so obtained had an organic to aqueous ratio of 2/1. As in the first test, the percentage of Iridium and Ruthenium stripped was determined by analysis of the separated phases.

Table 2

% of Iridium-Ruthenium Stripped

| Test No. | Strippant | Organic Assay g/l | | | | | | Assay g/l | | | % Stripped | | |
|---|---|---|---|---|---|---|---|---|---|---|---|---|---|
| | | Loaded | | | Stripped | | | Strip Solution | | | | | |
| | | Rh | Ir | Ru | Rh | Ir | Ru | Rh | Ir | Ru | Rh | Ir | Ru |
| 1 | $N_2H_4.2HCl$ in 2N HCl | 0.030 | 0.32 | 0.59 | 0.020 | 0.18 | 0.49 | 0.020 | 0.28 | 0.21 | 33 | 44 | 17 |
| 2 | NaOH plus $N_2H_4.2HCl$ in 2N HCl | 0.030 | 0.32 | 0.59 | 0.008 | 0.04 | 0.08 | 0.044 | 0.56 | 0.97 | 73 | 88 | 86 |

It can be seen from the above table that the alkaline plus acidified reductant strip system significantly increases the percentage recovery of Iridium and Ruthenium from the loaded solvent. The beneficial result obtained from the two-step stripping system is the production of good barren organic for recycle back to the extraction stages of the Rhodium separation circuit.

From the foregoing it will be seen that the present invention combines a rapid technique for separation of Iridium and/or Ruthenium from Rhodium with an efficient extraction and stripping system. The separation and recovery procedure are quite specific and will function in solutions containing widely varying quantities of the respective metals. The economy and speed of operation of the present process make it ideal for incorporation as part of a continuous processing system for separation of Rhodium essentially free of Iridium and/or Ruthenium from aqueous acid solutions of such metals.

What is claimed is:

1. A continuous process for the separation and recovery of Rhodium and Iridium dissolved in aqueous chloride solutions which comprises:

contacting said aqueous chloride solution with an organic solvent containing an organically substituted quaternary ammonium halide having the following structure:

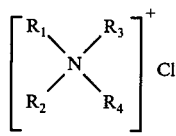

wherein $R_1$, $R_2$, $R_3$ and $R_4$ are hydrocarbon groups for a predetermined time period to form an organic extract phase and an aqueous raffinate phase, said quaternary ammonium compound being sufficiently soluble in said solvent to make a 1% solution, separating said extract phase from said aqueous phase, contacting said separated extract phase with at least the stoichiometric amount of aqueous sodium hydroxide solution required to neutralize the chloride form of said amine and form a metallic hydroxide precipitate, contacting said alkaline treated solvent with at least a stoichiometric amount based on the stoichiometric value of said alkaline solution of an acidified aqueous reducing agent, said contact resulting in the formation of a loaded aqueous phase and a stripped organic phase, separating said loaded aqueous phase and said stripped organic phase, and recovering Iridium from said loaded aqueous phase, maintaining said Rhodium in the form of a cationic complex and maintaining said Iridium in an anionic state throughout said extraction procedure.

2. A process for the separation and selective recovery of Rhodium, Ruthenium and Iridium values from an aqueous acidic medium which comprises contacting the medium with an organic extraction reagent comprising a water immiscible solvent having dissolved therein an organically substituted quaternary ammonium compound having the structure

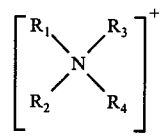

wherein $R_1$, $R_2$, $R_3$ and $R_4$ are hydrocarbon groups, said compound being sufficiently soluble in said solvent to make a 1% solution and capable of forming complexes with Iridium and Ruthenium that are preferentially soluble in said solvent and whereby said contacting results in the formation of an organic extract phase and an aqueous raffinate phase, separating said extract phase from said aqueous raffinate phase, contacting said organic extract phase with a sufficient quantity of an aqueous alkaline stripping agent to neutralize the organic extract phase, said contact resulting in the formation of an aqueous phase loaded with said Iridium and Ruthenium and a stripped organic phase, and thereafter contacting said stripped organic phase and said loaded aqueous phase with a solution consisting of an acidified reducing agent which is at least the stoichiometric equivalent of said alkaline agent, and maintaining said Rhodium in the form of a cationic complex and said Iridium and Ruthenium in their anionic states during said extraction procedure.

3. The process of claim 2 wherein said alkaline stripping agent is a water-soluble member selected from the group consisting of the carbonates, bicarbonates and hydroxides of alkali and alkaline earth metals.

4. The process of claim 2 wherein said reducing agent is selected from the group consisting of acidified solutions of hydrazine salts, hydroxyl amine salts, reduced metallic salts, $SO_2$, and organic dicarboxylic acids.

5. The process of claim 2 wherein at least one of $R_1$, $R_2$, $R_3$ and $R_4$ is a fatty alkyl group.

6. The process of claim 5 which comprises conducting said contacting operation at a temperature between about 20° C and 40° C.

* * * * *